J. SACHS.
ELECTRIC SERVICE AND METER TESTING SYSTEM.
APPLICATION FILED MAY 11, 1915.
1,301,175.
Patented Apr. 22, 1919.
4 SHEETS—SHEET 1.
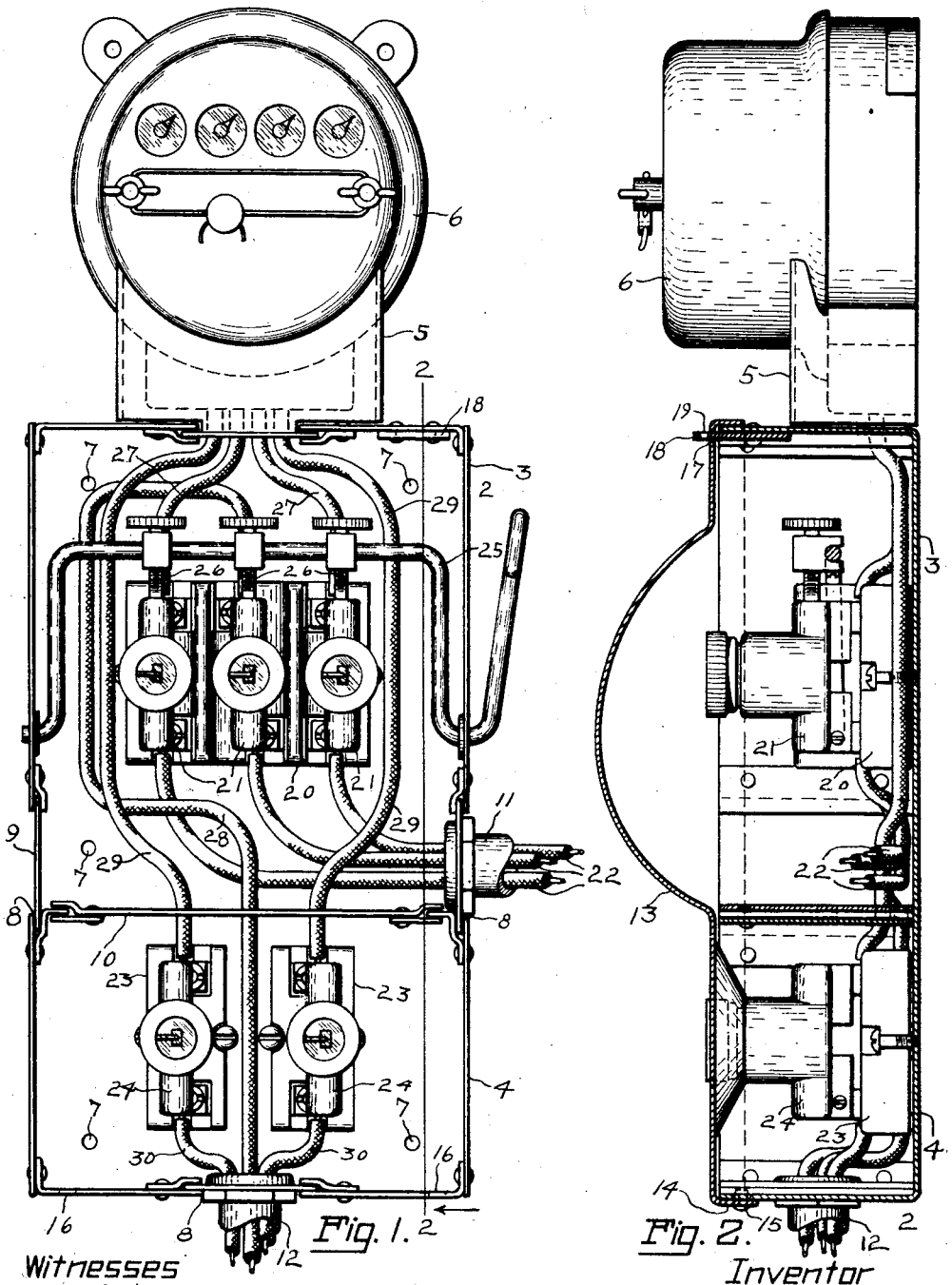
Witnesses
Otto Hilton
Franz Volker
Inventor
Joseph Sachs.
By Heath Sutherland
Attorney

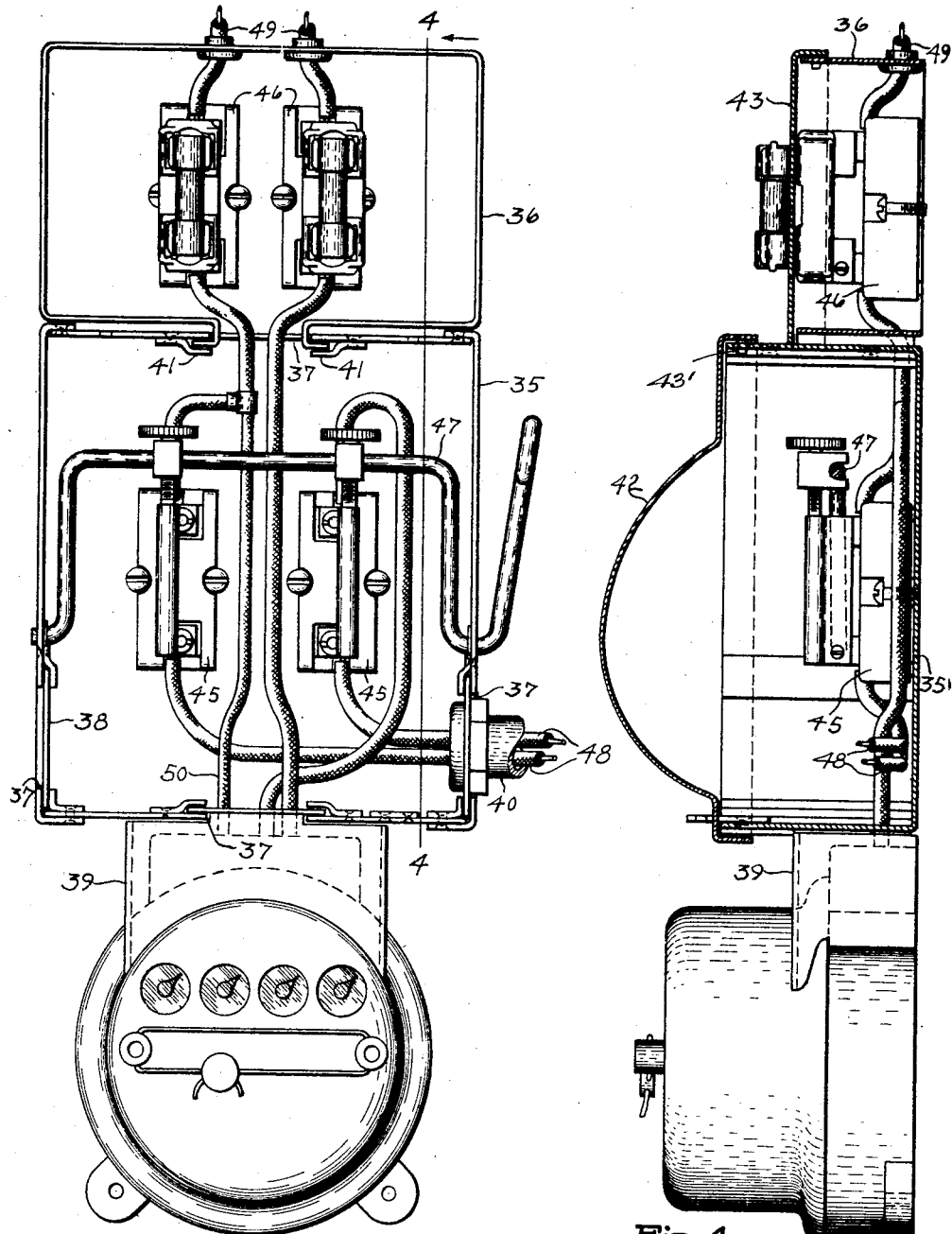

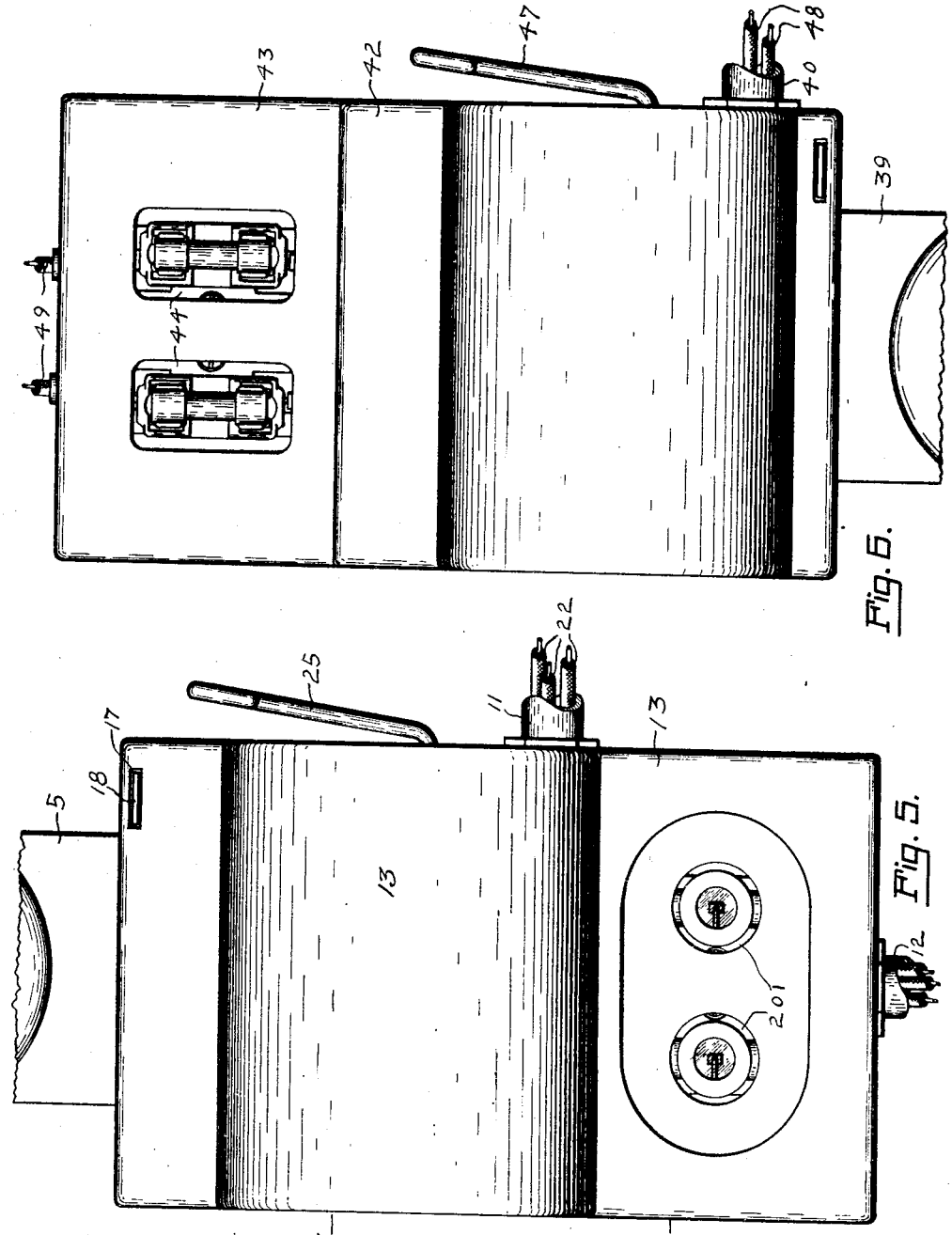

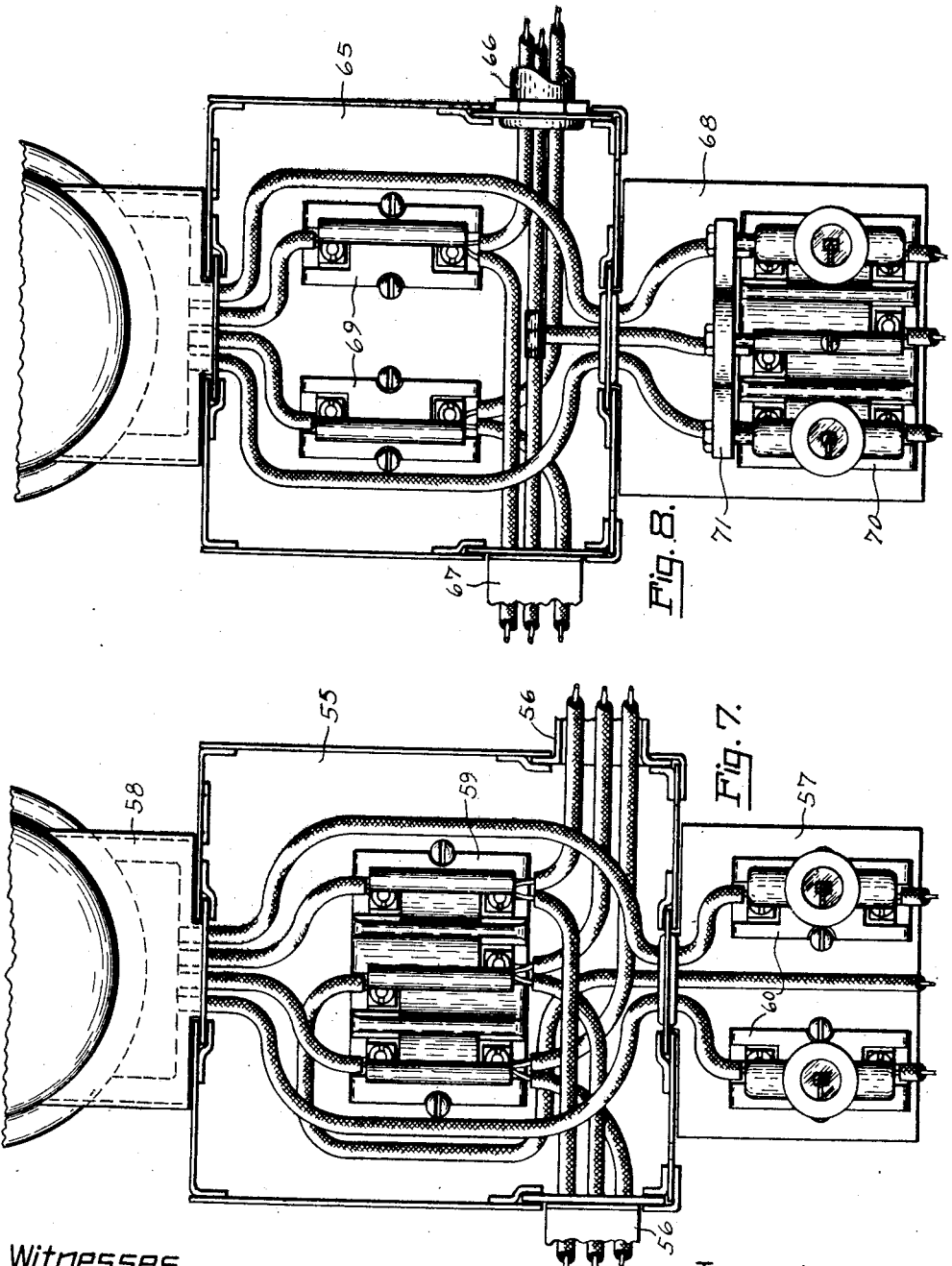

UNITED STATES PATENT OFFICE.

JOSEPH SACHS, OF HARTFORD, CONNECTICUT.

ELECTRIC SERVICE AND METER TESTING SYSTEM.

1,301,175.  Specification of Letters Patent.  Patented Apr. 22, 1919.

Application filed May 11, 1915. Serial No. 27,360.

*To all whom it may concern:*

Be it known that I, JOSEPH SACHS, a citizen of the United States, residing at Hartford, in the county of Hartford and State of Connecticut, have invented certain new and useful Improvements in Electric Service and Meter Testing Systems, of which the following is a specification.

This invention relates to what I shall for convenience term an electric service and meter testing system. In Letters Patent No. 1,211,629, for electric switches and meter testing systems, issued to me January 9, 1917, I have shown, described and claimed an organization involving the use of what I denoted in that application as "base block units." By the use of these units with the association therewith of such element or elements as may be requisite I can produce various differently functioning appliances, such as cut outs, switches or meter testing and service connection blocks, which are merely three of many different examples. In the present case I provide a system in which I use unit base blocks; by this I do not mean to imply that it is necessary to employ the identical unit base blocks of my prior application, although this is what I prefer to do. In using these base block units in such combination as the exigencies of the particular case may require, I so dispose them in relation to one another and also in relation to certain coöperative elements if present, to produce a complete service and meter testing appliance functioning to properly connect the service with the customer's load and the installed meter, while at the same time serving if desired, as a circuit controlling switch for that particular service and also as a meter testing service connection block, so that when necessary or desirable the installed meter can be easily tested in any one of several different ways one of which has been already described in my prior patent already identified.

In the particular invention here under consideration I have so combined such of the base block units and other coöperative elements as may be necessary in such a manner that there is provided a service connection appliance, a part of which is located, placed or disposed so as to be accessible only to the authorized person, and which for instance, may be accomplished by inclosing this part under lock or seal. Another part of the appliance is so located, placed or disposed as to be readily accessible at all times.

Where an electric service company installs a service connection it is desirable that means be provided to seal or lock up against unauthorized tampering, certain connection parts of the service connection in order that there will be no theft of current or unauthorized connection to the service before the current has been passed through the meter and properly measured. Consequently there have been produced devices, or appliances placed in housings or casings which are suitably associated and related with the installed meter, so that the service wires connected to the service connection device and extending to the meter are properly protected for the purpose described. As an instance of such appliances, I may refer to my Patent No. 1,245,036 of October 30, 1917, for protective casing for electric service connection and meter device, in which is shown a form of protective housing or casing for such service devices. In my Patent No. 1,211,629, there are shown other forms of protective casings or housings for this purpose operatively related with these connection, switching and meter testing appliances. In such devices or appliances as have just been referred to, the connection parts, elements or members of the complete appliance on the service side and on the load side of the meter are both shown as incased in the same compartment or chamber of the housing. Consequently while the protective requirements are fulfilled in such a disposition of the service connection parts, members or elements of the appliance, it is possible only, however, to reach any particular part of the connection devices, when it may be necessary, by unlocking or breaking the seal of the box, and this should only be done by authorized persons. Therefore, in the case where such connection appliances are equipped on either the load or the service side with protective devices such as for instance fuses, the blowing of a fuse so incased and sealed in a housing would disconnect the load from the service until someone authorized opened the box and renewed the fuse. Consequently the consumer would be without current during that period.

Again in such just referred to arrangements the installation of the complete service connection appliance with its housing is usually considered as a unit. From this aspect it is common for the electric service company to install the complete appliance including its housing and connection devices on both the service and the load end and including such switching and other cooperative elements as may be desired. Electric service companies are naturally desirous of reducing the investment in making each particular service connection, and consequently are desirous of in some way distributing the cost in making the service connection, so that the expense of purchasing and installing the necessary service connection appliances does not fall entirely upon them. This condition is met in the present invention by the use of my already referred to base block units which are so disposed that one or more of these units may be installed and placed by the electric service company on what may be called the service side, and which electric service company installed unit or units may be incased or housed and locked or sealed against tampering or manipulation by any one except authorized representatives of the company. Another or other base block unit or units may be installed by the consumer or the contractor on what may be called the load side in such relative position, placing or location to the first above referred to base block units that the load side unit or units and the service side unit or units may be coöperatively manipulated for testing, switching or other purposes in the manner already shown, discussed and described in the several copending applications referred to. The load side unit or units may be placed in close proximity if desired, to the service side unit or units, and may be incased or unincased. If incased the casing may completely surround the load side unit or units, or it may only partially surround the load side unit or units, but in either case if a casing for these units is provided, the renewable element such as the fuses of the load unit or units, is made readily accessible so that this part of the load side unit or units can be reached and manipulated by the consumer. It will, however, be understood that it is not essential that the consumer should be able to manipulate any other parts of the load side unit or units, and if desired the casing may be of such design so that while permitting the manipulation of the fuse parts of the load side unit or units, it prevents tampering or manipulation of other parts of the units.

Whether a casing is provided for the load side unit or units or whether these units are unincased, it is desirable that means be provided for holding them in a definite relation with the service side unit or units, although it will be understood that such means are not imperatively essential.

It will be clear that with such a division of obligation, a very excellent result is brought about, because it is now possible for the electric service company to install its service side connection parts and for the consumer or contractor to install his load side parts, elements or members of the service connection appliance. Notwithstanding such division of the expense and the investment of the service connection there is yet a universality of relationship between the service side and the load side connection parts, members or devices, so that there may be associated with either side correlative elements such as for instance, switching operating devices, and furthermore the service and load side elements, parts or members, that is to say the base block unit or units on the respective sides are of such character and construction, as has already been shown and described in my prior Letters Patent No. 1,216,629, as to be susceptible for the ready, simple and expeditious connection therewith and thereto of testing appliances for the proper testing and checking up of the installed meter by the electric service company's representative or such others as may be duly authorized when necessary. In fact this functioning of the complete appliance for meter testing purposes is exactly as has already been shown and discussed for example in my Patent 1,211,629.

It may also be stated at this time that due to the universality of the disposition, mounting, placing or locating of my base blocks units with relation to each other, that it is possible to use what I have termed the main base block unit on either the service or the load side and the auxiliary base block unit or units on either the service or the load side. Furthermore it has been made clear, in my Patent No. 1,211,629, and also in my Patent 1,170,113, a switch operating element may be associated with either the main base block unit or with one or more of the auxiliary base block units or with auxiliary and main base block units in combined relationship with the switch operating element. Another feature of the present invention is that in coöperative relationship with the base block units I use a protective housing of advantageous form and construction, providing therein a compartment or chamber for the service side connection parts, elements or devices, and which chamber or compartment may be properly sealed and locked, and also provide for coöperative association with the aforesaid service side chamber or compartment means for carrying or mounting the load side devices, and which latter means may be in the form of a boxing or housing or merely a support, but in either case is preferably associable with the first aforesaid compartment or housing so as to be interchangeably placeable in relation thereto. I may also state at this point that there may be associated with either the service or the load side parts or both, suitable fuses, or there may be switch operating elements on either or both sides. From the showing in the drawings hereinafter referred to, it will also be clear that I propose to make it possible for the interchangeable disposition or relationship to the what may be called service side compartment or chamber or housing of a meter adapter and the load side device supporting or inclosing means, so that the meter may be interchangeably placeable with the load side devices in relation to the main service side supporting compartment, chamber or housing.

In the drawings accompanying and forming part of the present specification, I have represented in detail several of the many different forms of embodiment of the invention. These will be set forth fully in the following description. It will be clear that I do not restrict myself to this construction; I may depart therefrom in many respects within the scope of the invention defined by the claims following said description.

Referring to said drawings:

Figure 1 is a face view of an electric service and meter testing appliance comprising my invention, both the service and the load side parts being incased or housed in a common two compartment box, the cover of which is removed, the meter being shown in place.

Fig. 2 is a longitudinal section on the line 2—2 of Fig. 1 looking in the direction of the arrow, the cover being in place.

Fig. 3 is a view corresponding to Fig. 1 of a different form of the appliance, this view illustrating the meter as being below the service side devices instead of above as in Fig. 1, the cover of the interchangeably associable boxes being off.

Fig. 4 is a longitudinal section on the line 4—4 of Fig. 3 looking in the direction of the arrow, the covers of the boxes being on.

Fig. 5 is a face view of the appliance shown in Figs. 1 and 2 with the cover on, the meter being broken away.

Fig. 6 is a similar view of the appliance represented in Figs. 3 and 4 with the cover on, and with the meter also broken away.

Figs. 7 and 8 are views corresponding to Figs. 1 and 3 of still further arrangements, the load side devices in both these forms of the appliance being unincased.

Like characters refer to like parts throughout the several views.

I provide a suitable support. This support may as will be inferred, vary decidedly in construction, depending upon the arrangement of the various parts of the appliance. It is important that it should have a section, compartment or chamber to receive the service side devices, and as I have already noted, this compartment is maintained under lock and key or sealed or is otherwise of such nature as to prevent unauthorized tampering with any of the parts inclosed thereby. The support may also have as a part thereof means on which may be mounted the devices of the load side of the appliance. As will be gathered, there are load side devices which coöperate with the service side devices in any individual installation. These load side devices may be mounted in any desirable way. I prefer that the support to which I have alluded be provided with means in or on which the same may be mounted. I provide preferably a two section support, one a service side chamber or compartment, and the other of which presents the load side section, chamber or compartment. These two sections or compartments when present may have a cover or lid, or each may have its own cover or lid. When the load side devices are not incased and when the support is provided with means for carrying them, this carrying means may be of any suitable character. There may be instances as will hereinafter more particularly appear where the support may be of sectional type, and in this event the sections are interchangeable. That is to say the complete support will always comprise a sealed or locked service side portion, but the load side portion of the support, detachably and interchangeably related to the service side of the support, may be of many different forms. It may be in the form of a casing or housing made so as to permit of the accessibility of the load side connection devices therein, or it may be in the form of a mere backing or connectible plate supporting the load side devices but leaving them entirely exposed.

Referring first to Figs. 1, 2, and 5, the support represented in these views is denoted in a general way by 2 and is in the form of a boxing, and by boxing I do not mean a box but a structure which has one or more sections or compartments or which has a single section or compartment. This support or boxing 2 comprises a main, primary or service side box or casing 3, and an auxiliary, secondary or load side box or casing 4, the interior of the box or casing 3 constituting a convenient compartment or chamber to receive the service side devices while the interior of the box or casing 4 presents a suitable chamber or compartment for receiving the load side devices. A meter adapter or extension is denoted by 5 and associated with it is the meter 6. The support or boxing 2 is attached to a suitable backing or foundation which may be a wall or board, and to so mount it, the back or the backs of its sections may be perforated as at 7 to receive suitable fastenings as screws. The backing of the boxing 2 in both the main or service side and the auxiliary or load side section is provided with suitable means for receiving fastenings to hold in place the necessary service and load side base block units. The boxing 2 has the backing or bottom plate referred to and extending outwardly from each side or edge thereof, is a wall, so that there is formed as shown a suitably shaped walled body. Each of the walls is provided with slots or apertures as 8 adapted to be closed by suitable slides as 9. These slides may be blank or perforated in any desired fashion, and they may serve alone or for attaching thereto certain other members such as for instance the meter adapter 5 which as shown is connected to and forms part of the slide in the slot or aperture of the upper wall of the boxing. The boxing is divided into two sections 3 and 4 by the removable partition 10, this partition being suitably apertured to permit of the passage of the necessary wires from one section to the other. The slide 9 on the right is suitably connected to the service conduit 11, while the slide 9 on the lower wall of the boxing is connected with the load conduit 12. As will be clear the conduit pipe 11 may be connected to either side of the boxing and as will also be clear, the slide 9 in the left wall of the boxing may also have connected therewith suitable ducts or wireways or be otherwise provided with means to permit of the carrying from the section 3 of the boxing of such wires as may be desired. While I have shown only four means for receiving the slides, it will be understood that there may be any number of such means. The entire boxing is provided with a single cover as 13 which as may be noted in passing is common to both sections 3 and 4. The cover has the lip 14 entirely around its edge. At the lower end of the cover, the lip is provided with pins as 15 adapted to enter holes or apertures as 16 in the lower wall of the body of the boxing. The cover at or near its upper end has an aperture 17 through which passes the seal piece 18 when the cover is in place. The seal piece is fastened to the upper wall of the body of the boxing and the end projecting exteriorly of the cover when in place has openings as 19 for receiving a seal or lock. The lower portion of the cover 13 has means such as an opening or openings by which access may be conveniently had to the interior of the load side section 4. In this particular instance, this is to provide accessibility to a fuse or fuses on the load side devices. As represented the cover or lid 13 has duplicate openings 201 by which these fuses or their equivalents can be reached.

As will be obvious from the remarks already made, the appliance comprises a plurality of base block units separately mounted, and these units may be either of what I have denominated in my Patent No. 1,211,629, as main base block units or auxiliary base block units. In a given installation there may be one or more main base block units separately mounted, operatively associated with one or more auxiliary base block units, or there may be one or more auxiliary base block units operatively associated with each other, or there may be one or more main base block units operatively associated with each other. In other words, I wish to make it clear, that I do not limit myself to any particular number or kind of base block units than is requisite to present an operative appliance functioning in the desired purpose. What I have denoted a main base block unit comprises as a preference, a plurality of pairs of contacts or their equivalents and their associated connectors, whereas what I have termed an auxiliary base block unit consists preferably merely of a pair of contacts or analogous parts and coacting connector, and as will be inferred this connector may be any one of a variety of styles. For illustration, it may be plain or on the other hand it may be fused, and if fused may in turn carry any one of different kinds of fuses. As has been already explained in my Patent 1,211,629, certain particular arrangements of the main and auxiliary base block units have been found satisfactory. For instance, as stated in the application just mentioned, a main base block unit provided with three pairs of contacts and their associated connectors. I also prefer to utilize merely but a single pair of contacts and a coöperating connector in an auxiliary base block unit.

It will be apparent that in an appliance there must necessarily be one base block unit, at least, which is normally inaccessible and at least another base block unit which is accessible or at least the fuses or equivalent devices of which can be reached for replacement. In some apparatus one or more of these base block units may be inaccessible, whereas one or more of their fuses or equivalent parts will be accessible.

Referring now again to Figs. 1 and 2, I denote in a general way by the numeral 20 a main base block unit. This unit has an insulating body, for instance of porcelain equipped preferably with three pairs of contacts and wire connecting members. Associated with each pair of contacts is a connector as 21 constituting a part of the unit in question. This is a quite brief description of a main base block unit which is suited to my purposes and which closely resembles one of the main base block units disclosed in said Patent 1,211,629. The connectors 21 are all fused with plug fuses. This main base block unit 20 as represented is mounted in the main casing or housing 3 and being connected on the service side of the meter and to the service wires 22 constitutes the service side unit. This main base block unit which as arranged serves the purpose of a service side unit is shown mounted in the service side or main chamber, compartment or box 3 of the boxing 2 and may be held in place by screws or otherwise. It will be clear that the backing or bottom plate is suitably perforated with threaded holes to receive the fastening means to hold down the main base block or such of the auxiliary base block units as may be desired for mounting in said main chamber.

In the load side compartment, box or casing 4 are mounted the auxiliary base block unit means shown in the particular construction under consideration as comprising two of such auxiliary base block units 23 fastened in place to the back or equivalent part of said chamber 4 in such manner that one or more of such units can be dismounted, and if occasion requires, a main base block unit substituted therefor. Screws as already noted present a simple and convenient means of holding the auxiliary base block units removably in position. Each base block unit 23 is provided with a pair of contacts on the insulating body thereof the contacts as is the custom being provided with wire connecting means. With each pair of contacts is associated a connector 24 which in the construction is of the same character as the connectors 21, although as will be obvious any other suitable connector might be employed in lieu thereof.

The main base block unit may as illustrated, have associated therewith a switch operating element of suitable nature. This as will be understood may be any one of several kinds. That shown is denoted in a general way by 25 and is of the externally operable type being in construction substantially like that shown and described in the first application hereinbefore mentioned. This switch operating element 25 is equipped with coupling pins 26 which can be connected to or disconnected from, at will, one or more of the connectors 21, and when the connectors are coupled to the switch operating element 25, they can be operated and serve as circuit controlling switching elements. In the particular arrangement shown each of the three connectors is coupled to the switch operating element, and consequently when so coupled and operatively associated with the switch operating element constitutes a three-pole or three-wire switch.

The particular service installation shown in Figs. 1 and 2 is a three-wire installation, the meter being a two-coil, three-wire meter, each coil being in one of the outside legs of a three-wire circuit. The three service wires 22 enter the main chamber or compartment 3 through the service pipe or conduit 11, being connected to the service end of each of the three pairs of connection and contact members mounted on the main base block unit 20. The circuit from each service wire is continued through its respective connector to the meter end connection and contact member of that particular pair. The wires of the circuit now continue from the main base block units and extend to the meter and load. The two outside wires 27 of the circuit, each extending and connected to one terminal of each of the coils of the meter respectively, may be called the meter wires, the wire 28 extending from the load end contact and connection member of the base block unit is a load wire and passes directly to the load. There is no tap from the neutral wire to the meter, because the potential coil of the meter is inside connected. Extending from the opposite terminals of each of the two meter coils are the meter wires 29, and these at their other ends are connected to the meter end connection and contact member of each of the two auxiliary base block units 23. The circuit now extends to the load through each of the connectors 24 to the load end connection and contact members of the auxiliary base block units 23 at which point the two outside load wires 30 are connected.

I have shown in a number of prior patents how an appliance constructed as hereinbefore may be utilized in meter testing and specifically I might mention Patent No. 1,170,112 of February 1, 1916, and also Patent No. 1,170,139 of February 1, 1916. It will be understood in meter testing that the so-called flexible bridge or by-pass system of testing devices will be preferably used, such as has been shown and described in said Patent 1,170,112. In by-passing it will be understood that the cable or flexible wire of the by-pass will be of sufficient length so as to permit of its connection across from one of the outside connectors of the main base block unit to the correlative connector of one of the auxiliary base block units. When this is done one or both of the connectors may be opened up so as to free its coöperative connection and contact member for testing purposes, that is for the reception or connection therewith of proper testing plugs of the main testing circuit or such other testing devices as may be necessary. The manner of connecting to the other contacts and parts of the main and auxiliary base block units need not be here described, as this will be practically identical with that already discussed in the hereinbefore mentioned applications. It is obvious when testing that the cover or lid 13 must be removed in order to permit of application of the necessary testing devices. I also might note that the openings or apertures 201 are opposite the fuses of the connectors 24 so that if either of these fuses be blown, it can be easily removed. However, it will be noted that the fuses on the main base block unit are inaccessible as are also all of the other connection and contact parts and devices within the main chamber 3. The fuses on the main base block unit are on the service side of the meter in each of the poles or wires of the circuit. The fuses on the auxiliary base block units are on the load side of the meter in the two outside poles or wires of the circuit. It will, therefore, be desirable that the fuses on the main base block unit be of greater capacity than the fuses on the auxiliary base block units, it being intended that ordinary abnormal conditions should permit of fuse replacements by the consumer but extremely abnormal conditions should require the attention of the service company's representative. Consequently when the abnormal condition is so severe that the fuses on the service side of the meter blow as well as the fuses on the load side, then the installation requires the attention of the company's representative.

In Figs. 3, 4 and 6 is shown another form of boxing as well as base block unit arrangement. In this particular showing the support is of different character from that already described. It has detachably connected sections, and as will be inferred, these may be of any suitable kind. For example and as illustrated they consist of boxes or casings separably connected in such way that their relative positions may be varied, although as a matter of fact I prefer that the main section or box be permanently fastened in place and that the auxiliary section or box of the complete support can be removed from the main box or support to change its position with relation thereto. The main section or box is designated by 35 and the auxiliary section or box by 36. The main section or box 35 of the complete support has a back or bottom plate provided with suitable holes to receive fastening means such as screws, so that it may be securely held to a foundation. Extending outwardly from the back plate are the four walls, each wall having a slot or aperture 37, and these walls are equipped with means for receiving slides as 38 or other parts such as the meter adapter 39 or auxiliary box or section 36 which can thus be connected with the main section or box 35. As heretofore one of the slides is fitted to the end of a service pipe 40 which is shown entering the main section through the right hand wall, but as will be understood it may enter at any other point. The particular arrangement of boxing with the two detachable sections as shown is of particular utility and advantage in permitting the interchangeable placing of the meter either above or below the main section or box 35. The manner in which this can be accomplished is due to the fact that the slide receiving apertures or slots in the main box walls are all alike. Consequently the meter adapter 39 may be placed as shown in the lower wall, or when the auxiliary section is dismounted, it can be substituted for the latter, and when said meter adapter is so placed in connection with the upper wall, then the auxiliary section or box 36 will be placed in connection with the lower wall. It will be noted that when the auxiliary box or section 36 or the meter adapter 39 are attached to either the upper or lower wall of the main section 35, they are securely held in place as are also the slides 38 due to the presence of the overhanging lips 41 (Fig. 3) of the slide holding means. Each of the two sections 35 and 36 has its individual cover, the cover for the main section 35 being denoted by 42 and the cover for the auxiliary section 36 being denoted by 43. The cover 42 is mounted and locked and sealed exactly like the cover 13. The cover 43 is practically similarly mounted excepting that at the end where it abuts the main section 35 there is a projection 43′ from the cover 43 extending outwardly and inside the lip of the main cover 42, it being held in position and locked on the auxiliary section or box 36 when the main cover is locked and sealed in the manner described. In the present construction the cover 43 is not normally openable, although access may be had to the fuses of the connectors associated with the auxiliary section or box 36 as will now appear. Openings 44 in said cover 43 are provided through which the fuses of each of the base block units located in the auxiliary box or section 36. project.

The particular installation of Figs. 3, 4 and 6 is a two-wire installation. The base block units used in both the main and service side section or box 35 and the auxiliary or load side section or box 36 of the complete support are all of the auxiliary base block unit type. On the service side in each of the two wires of the circuit, there is an auxiliary base block unit denoted in a general way by 45, and these may, therefore, be called the service side base block units, although they are of the auxiliary type. On the load side of each of the two wires of the circuit, there is an auxiliary base block unit denoted in a general way by 46, and these may be called the load side base block units. They are also of the auxiliary base block unit type. It will be noted that the service side base block units are unfused, while the load side base block units have their connectors provided with inclosed fuses which as shown extend through the openings or slots 44 to which I have already referred. Certainly as will be clear, from what has already been said, the service side base block units in the main box section or case 35 are inaccessible, while the fuses of the load side base block units are accessible and manipulable, although the connector itself of these units cannot very well be reached for manipulation or operation.

Associated with the base block units 45 on the service side is the switch operating element 47 connectible and disconnectible with the connectors of the aforesaid base block units in the manner already described. This switch operating element is of the exteriorly operable type, but instead of being provided with three connector coupling means has only two, so that when coupled with the connector elements of the base block units 45, a two-pole exteriorly operated switch is presented.

It will be unnecessary to follow out in detail the extension of the circuit from the service wires 48 through the service base block units, the meter coil and the load side base block units to the load wires 49. This circuit path is clearly shown in Fig. 3. The wire 50 is the potential tap from one side of the circuit to one side of the meter coil.

In Fig. 7 I have shown an organization consisting of a service connection appliance arranged for a banked installation. That is to say there are a number of consumers connected to the service, each of which consumers have their individual service connection and meter testing appliance. In such banked installations it is not always necessary that each consumer have a service switch. The support of the appliance shown in Fig. 7 is of the same interchangeably connectible character with its two separably connectible sections as that shown in Figs. 3, 4 and 6. The main section or box 55 is substantially like the main section or box 35 of the appliance of Fig 3 with the exception that it is not provided with means for supporting the switch operating element since no such element is used in this case. Also instead of a service pipe or conduit being connected to this main section or box 55, there is connected to each of the two side walls what may be called a trough denoted in a general way by 56, the one on the left being shown with the cover on, and the one on the right with the cover off. These troughs are provided for connecting adjacent main sections like 55 or 35 or similarly arranged and correlative parts. The auxiliary section 57 is in the form of a plate provided with an outwardly extending portion connectible in slide-like form with the walls of the box in the manner shown and as already described in connection with the slides and similar parts of Figs. 3, 4 and 6. Due to this arrangement this auxiliary plate or section 57 may be connected either with the lower wall or section 55 as shown or when the meter adapter 58 is removed from the upper wall, this auxiliary section or plate 57 may be put in its place and the meter adapter then may be placed in connection with the lower wall. In the wall connected slide portion of the plate 57 there is provided means such as a perforated bushing to permit wires to extend from one section to another through the perforations in the bushings.

The particular subscriber's installation shown in Fig. 7 is a three-wire installation, but as has already been stated, there is no service switch. The meter is of the two coil, three wire type. The fuses instead of being on the service side are here shown as in the case of the showing of Figs. 3, 4 and 6 entirely on the load side. In this particular three-wire installation, a main base block unit 59 is shown installed in the main section or box 55 and is, therefore, the service side base block unit and is inaccessible due to the fact that the cover to this main section is sealed or locked, it being of the same construction as the cover 42 in Fig. 4. The base block units 60 on the load side are of the auxiliary base block unit type and are wholly exposed. There are only two auxiliary base block units used on this load side, the neutral wire passing through directly from the central or neutral parts of the main base block units on the service side.

In Fig. 8 there is shown an installation of the same character as that shown in Fig. 7 with the exception, however, that instead of in this particular case there being a trough on each side of the main section 65, there is a service pipe 66 connected to the right hand wall, while a trough 67 extends to another main section or similar device, adjacent thereto. As in the case of Fig. 7 the auxiliary section consists of the separably connectible plate or carrier 68. While this particular subscriber's installation is also a three-wire system, yet the arrangement of base units here shown is entirely different than the arrangement shown in Fig. 7. On the service side and located in the main section or box 65 are two unfused base block units 69 of the auxiliary base block unit type, one being connected in each of the two outside legs of the circuit. On the load side and mounted on the auxiliary section or plate 68 is a main base block unit 70 of the main base block unit type. This main base block unit 70 is equipped in its outside poles with fuses and the three connectors are shown coupled to a switch operating element 71 of the direct operating type. Each of the connectors is coupled to the switch operating element 71 by means of studs or pins, the central pin being held to the central connector by a screw or other convenient means practically as shown for instance in Fig. 1 and already described, so as to firmly associate the switch operating element 71 with the connectors and permit of their operation collectively to perform the function of a three-pole circuit controlling switch, all as fully shown in Fig. 8. Each of the three connectors of the base block unit 70 on the load side is in the path of one of the wires of the circuit. It will be noted that the neutral wire of the circuit is not connected with any base block unit on the service side, it being directly tapped off and extending to the central or neutral element of the load side base block unit 70.

It will be seen from the showing of Fig. 8 that the switch instead of being on the service side is on the load side of the appliance, wholly accessible both as to its operation as a switch to open and close the circuit and also so far as concerns the manipulation and renewal of the fuses on the two outside legs of the base block unit 70. However, due to the fact that the cover on the main section or box 55 is sealed and locked in place as heretofore described, it being of the same construction as that used in connection with the appliance of Fig. 7 or Figs. 3 and 4, the base block units and connections on the service side are inaccessible, but the base block unit 70 on the load side with its fuses which functions as a circuit controlling switch is entirely accessible. Now to test the particular meter installed in conjunction with this installation of Fig. 8, it is certainly necessary to remove the cover of the main section 65, and it is also necessary to uncouple the switch operating element 71 from the three connectors of the base block load side unit 70. After this is done then the manipulation of the connectors on the load and the service side is generally the same as has been fully discussed heretofore and is now no doubt fully understood.

What I claim is:

1. In a device of the character described, circuit-controlling means connectible on the service side of an electric meter, circuit-controlling means connectible on the load side of said meter, a box for inaccessible inclosing the service side connectible means, the load side connectible means being accessible, and means coöperatively associated with said service and load side connectible means whereby the meter may be tested through the medium of said service and load side connectible means.

2. A device of the character described comprising a support having a service side portion and a load side portion, one of the portions being equipped with means for receiving an electric appurtenance and the other portion being provided with means for receiving another electrical appurtenance, the device having means for normally preventing access to the part carried by the service side portion, and also having means to permit a meter test through the coöperation of said parts carried by the service side and the load side portions.

3. In a circuit-controlling and meter testing appurtenance, circuit-controlling means connectible respectively on the service and load side of an electric meter, a casing for inaccessible inclosing the service side connectible portion, the load side connectible portion being accessible, and means whereby said meter may be tested through the medium of said service and load side connectible means.

4. In a device of the class described comprising inaccessible circuit-controlling means connectible on the service side of an electric meter, accessible circuit-controlling means connectible in the load side of said meter, and means in association with said service and load side devices for the connection therewith of meter-testing means and whereby said meter may be connected for testing through the medium of said service and load side means.

5. An appliance of the character described comprising a circuit-controlling unit connectible on the service side of an electric meter, another controlling unit connectible on the load side of the meter, means for the association with said service and load side units of testing appurtenances, a support for said units, means for normally inaccessibly incasing the service side unit and for leaving a part of the load side unit accessible at all times.

6. An electric appliance of the character described comprising a plurality of circuit-controlling units, one of which is connectible on the service side and another of which is connectible on the load side of an electric meter, the load side connectible unit being provided with means for carrying a fuse, and means for inaccessibly incasing the service side connectible unit while normally permitting access to the fuse of the load side connectible unit, the service and load side units being arranged to serve for meter testing in addition to their normal circuit-controlling functions.

7. An appliance of the character described comprising a plurality of circuit-controlling units, one of which has means for carrying a fuse and is connectible on the load side of an electric meter, the other of said units being connected on the service side of said meter, means for inaccessibly incasing the service side unit while permitting access to the fuse of the load side unit, and means for connecting testing instrumentalities with said service and load side means.

8. An appliance of the character described comprising a service side and a load side connectible circuit-controlling unit, each of said units being provided respectively with means for the removable connection therewith of testing instrumentalities for meter testing purposes, and means for normally inaccessibly incasing the service side connectible unit while permitting access to the load side connectible unit.

9. In an appliance of the character described, a plurality of circuit-controlling units, one of which serves as a switch and another of which serves as a fuse-holding unit and said units being connectible on the service and load side of an electric meter, said units being arranged to permit of the connection therewith of testing means for meter-testing purposes, and means for normally inaccessibly incasing the service side unit while permitting accessibility to the load side unit.

10. In an appliance of the character described, a switching unit connectible on the service side of an electric meter, a fuse-holding unit connectible on the load side of an electric meter, means for inaccessibly incasing the service side unit while permitting access to the fuse of the load side connectible unit, and means associated with said service and load side units for the removable connection therewith of meter-testing devices.

11. An appliance of the character described comprising a support having a service side and a load side section, said sections being detachable from each other, a meter adapter detachably associable with the service side section of said support, said load side section and said meter adapter being interchangeably associable with said service side section on said support, and means associated with said service side section whereby the interior is made normally inaccessible and whereby said load side section and said meter adapter are secured to the service side section.

12. An appliance of the character described comprising a support having a service side and a load side section, the service side section being in the form of a box and provided with means whereby its interior is normally made inaccessible, a meter adapter associated with said service side section, and means whereby said load side section of said support and said meter adapter are interchangeably associable with said service side section when said means for preventing access to the interior of said main section is inoperative.

13. An appliance of the character described comprising circuit-controlling means connectible on the service side of an electric meter, circuit-controlling means connectible on the load side of said meter, and means for supporting said two means, for inaccessibly inclosing the service side connectible means and for permitting a meter test through the coöperative action of said two first-mentioned means.

In testimony whereof I affix my signature in presence of two witnesses.

JOSEPH SACHS.

Witnesses:
L. L. MARKEL,
HEATH SUTHERLAND.

Copies of this patent may be obtained for five cents each, by addressing the "Commissioner of Patents, Washington, D. C."